United States Patent
Cai et al.

(10) Patent No.: US 9,433,018 B2
(45) Date of Patent: Aug. 30, 2016

(54) SYSTEM AND METHOD FOR USING SIC TO SOLVE WIFI COLLISIONS

(71) Applicant: Futurewei Technologies, Inc., Plano, TX (US)

(72) Inventors: Lin Cai, Schaumburg, IL (US); George Calcev, Hoffman Estates, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 68 days.

(21) Appl. No.: 14/478,720

(22) Filed: Sep. 5, 2014

(65) Prior Publication Data

US 2015/0063340 A1   Mar. 5, 2015

Related U.S. Application Data

(60) Provisional application No. 61/874,155, filed on Sep. 5, 2013.

(51) Int. Cl.
*H04W 74/08* (2009.01)
*H04L 1/00* (2006.01)
*H04L 1/16* (2006.01)
*H04L 1/18* (2006.01)

(52) U.S. Cl.
CPC ........ *H04W 74/0825* (2013.01); *H04L 1/1671* (2013.01); *H04L 1/1854* (2013.01); *H04L 1/0003* (2013.01); *H04L 1/0009* (2013.01); *H04L 2001/0093* (2013.01)

(58) Field of Classification Search
None
See application file for complete search history.

(56) References Cited

U.S. PATENT DOCUMENTS

| | | | |
|---|---|---|---|
| 8,527,829 B2 | 9/2013 | Fong et al. | |
| 2005/0111452 A1* | 5/2005 | Mamillapalli | H04L 12/56 370/390 |
| 2005/0138671 A1* | 6/2005 | Love | H04H 60/11 725/123 |
| 2006/0018332 A1 | 1/2006 | Kakani et al. | |
| 2008/0019434 A1* | 1/2008 | Kim | H04B 1/71072 375/232 |
| 2009/0225876 A1 | 9/2009 | Sung et al. | |
| 2011/0051832 A1* | 3/2011 | Mergen | H04B 7/0452 375/267 |
| 2011/0090941 A1 | 4/2011 | Li | |
| 2011/0090947 A1 | 4/2011 | Peng et al. | |
| 2014/0269667 A1* | 9/2014 | Teague | H04W 56/0065 370/350 |

FOREIGN PATENT DOCUMENTS

EP    2237578 A2    10/2010

OTHER PUBLICATIONS

International Search Report and Written Opinion of the International Searching Authority received in Patent Cooperation Treaty Application No. PCT/US2014/054351 mailed Dec. 30, 2014, 12 pages.
Parekh, S., "IEEE 802.11 Wireless LANs," Unit 11, 1997, 64 Pages.
International Search Report and Written Opinion of the International Searching Authority received in Patent Cooperation Treaty Application No. PCT/CN2014/054351, mailed Dec. 30, 2015, 12 pages.

* cited by examiner

*Primary Examiner* — Michael Thier
*Assistant Examiner* — Eric Nowlin
(74) *Attorney, Agent, or Firm* — Futurewei Technologies, Inc.

(57) ABSTRACT

An embodiment method of collision resolution includes receiving a frame A and a colliding frame B. The frame A and the colliding frame B are received over a channel and overlap in time. The method also includes decoding the frame A. The method also includes recovering and decoding the colliding frame B, at least partially, using successive interference cancellation (SIC).

16 Claims, 5 Drawing Sheets

SYSTEM AND METHOD FOR USING SIC TO SOLVE WIFI COLLISIONS

This application claims the benefit of U.S. Provisional Application No. 61/874,155, filed on Sep. 5, 2013, which application is hereby incorporated herein by reference.

TECHNICAL FIELD

The present invention relates generally to collision resolution and, in particular embodiments, to a station and a method of collision resolution using successive interference cancellation (SIC).

BACKGROUND

In an IEEE 802.11 wireless local access network (WLAN), the communication channel is shared by multiple stations, which are coordinated by a distributed channel access (DCA) function, e.g., a distributed coordination function (DCF), based on the asynchronous distributed carrier sense multiple access with collision avoidance (CSMA/CA) mechanism. A station with a data frame for transmission first performs a clear channel assessment (CCA) by sensing the wireless channel for a fixed duration, e.g., the DCF interframe space (DIFS). If the wireless channel is busy, the station waits until the channel becomes idle for a DIFS, and then waits for a further random backoff period. The backoff timer decreases by one for every idle slot and freezes when the channel is sensed busy. When the backoff timer reaches zero, the station starts data transmission.

If the data is received successfully, the receiver sends an acknowledgement (ACK) frame to the transmitter. If the transmitter does not receive an ACK during a certain interval, the transmitter retransmits the data frame after a random backoff. Note that each time a frame is not acknowledged, the transmitter doubles its backoff window until the maximum window is reached, which is referred to as exponential backoff.

In current WiFi, carrier sensing and exponential backoff are used for collision avoidance. Carrier sensing can efficiently prevent stations (STAs) within each other's sensing coverage from transmitting simultaneously. However, it does not work well when transmission STAs are hidden from each other. In high density WiFi with a large number of stations, severe collisions from multiple access can significantly degrade the network performance. By doubling the contention window size each time a collision occurs, the collision probability can be efficiently reduced when a large number of STAs are contending for channel access. However, a doubled backoff window also leads to a longer access delay of STAs, which degrades the quality of service (QoS) performance of STAs to some extent.

In addition, each time a collision occurs, the involved colliding STAs will re-attempt to transmit the same data again after a random backoff. Thus, collisions lead to inefficient channel utilization by wasting the channel air time due to retransmissions from all parties as well as a waste of battery power due to multiple retransmissions. The channel utilization efficiency of WiFi system is very low, e.g., less than 40%, due to the collisions and the involved collision avoidance overheads reflected by idle channel, including interframe spaces (e.g., DIFS and short interframe space (SIFS)) and backoff time.

SUMMARY

An embodiment method of collision resolution includes receiving a frame A and a colliding frame B. The frame A and the colliding frame B are received over a channel and overlap in time. The method also includes decoding the frame A. The method also includes recovering and decoding the colliding frame B, at least partially, using successive interference cancellation (SIC).

An embodiment station includes a receiver, a decoder, and a processor. The receiver is configured to receive a frame A and a colliding frame B. The frame A and the colliding frame B are received over a channel and overlap in time. The decoder is configured to decode the frame A. The processor is configured to recover the colliding frame B using successive interference cancellation. The processor is further configured to pass the colliding frame B to the decoder for decoding.

An embodiment wireless communication system includes a first station, a second station, and a third station. The first station is configured to transmit a frame A over a channel. The second station is configured to transmit a frame B over the channel. The frame A and the frame B overlap in time. The third station is configured to receive the frame A and the frame B. The third station is further configured to decode and acknowledge the frame A. The third station is further configured to recover the frame B using successive interference cancellation. The third station is further configured to decode and acknowledge the frame B.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
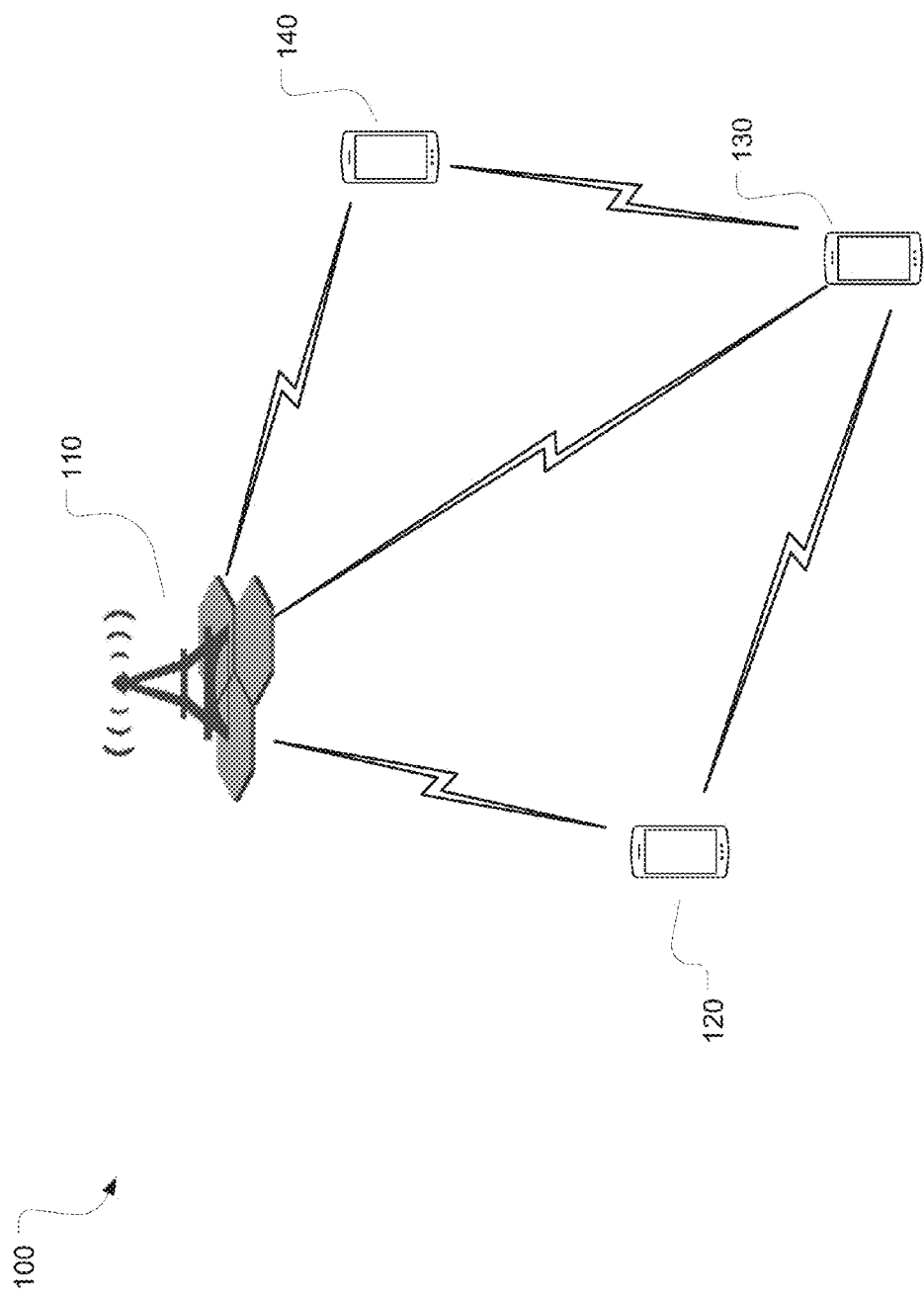
FIG. 1 is a diagram of a wireless communication system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

There are a large number of academia papers that studied how to improve the network performance by adjusting the protocol parameters, such as contention window size, retransmission limits, etc., based on the estimation of the number of contending STAs in the network. It is found that network performance can be significantly improved if the parameter settings can be optimally determined based on the current network status. However, it is well-known that CSMA/CA can achieve long term fairness, but very poor short term fairness due to exponential backoff. In other words, the unlucky colliding STAs have to increase their contention windows and thus experience longer delays. There is a large variation in the channel access delay of STAs. In a WiFi hotspot where STAs carrying different applications dynamically join and leave the WiFi from time to time, it is very difficult, if not impossible, for an AP to accurately determine the number of contending STAs in the network. Without an accurate estimation of the number of contending STAs, it is hard to decide the optimal parameter settings to achieve high performance.

Hybrid automatic repeat request (hybrid ARQ or HARQ) is a promising technology that combines high-rate forward error-correcting coding and ARQ error-control to improve data transmissions. In some HARQ schemes, if the receiver fails to decode the first transmission data, the receiver stores the erroneous data in a buffer and requests the data message anew from the sender. The receiver can use code combining techniques to combine the previously received data with subsequent retransmissions to decode the original message. HARQ is efficient to recover data from interferences and is widely used in cellular networks. However, in the present implementation HARQ is not and cannot be applied as a collision resolution solution as it could be hard for the receiver to identify the transmitters when the received data is corrupted due to collisions or interferences from random contentions. In the present implementations the HARQ is focused only on the recovering the interfered transmission and does not do anything about signaling and recovering the interferer. In cellular networks, only one user is scheduled for transmission at one time, and others are treated as interference. Thus, the receiver only needs to recover one data message from interference. In a WiFi system, it is possible that multiple STAs transmit to one receiver simultaneously due to random contentions, and multiple data recovery can improve the transmission efficiency. To achieve this, it is realized herein, additional steps need to be taken at the interferer, which waits from the receiver's acknowledge.

The IEEE 802.11 standard group recently launched a new study group, namely, high efficient WLAN (HEW) that targets to improve the efficiency of WLAN especially in high density deployment.

It is realized herein that SIC can be used to improve transmission efficiency and channel utilization in contention-based WiFi systems, while an increased backoff window and decreased modulation and coding scheme (MCS) rate can also reduce collisions and thus improve transmission efficiency and robustness. It is realized herein these features can be implemented in wireless networks, including IEEE 802.11 WLAN networks, via devices such as APs and stations.

Many WiFi systems have adopted a contention-based CSMA/CA media access control (MAC). A collision designates the overlap in time of two or more WLAN transmissions. In a high density WiFi deployment, contentions from a large number of contending STAs cause many collisions that degrade the system performance. It is realized herein that collision of two frames in a shared channel may not lead to the loss of both frames. One of the collided frames can still be successfully decoded by the receiver if its signal strength is much larger than that of the other frame, i.e., it has high signal to noise ratio (SNR), which is sometimes referred to as the capture effect. It is further realized herein that throughput with the capture effect can be as much as two times the throughput without the capture effect, which is revealed through simulation. However, the receiver acknowledges a single received frame, without any subsequent action to recover and acknowledge the other frame involved in the collision. It is also realized herein that SIC can be used to recover the other frame to improve transmission efficiency.

In WiFi systems, STAs generally use half-duplex transceivers for communication. STAs contend for channel access based on CSMA/CA MAC protocol. Given two frames, where a frame A starts at the same time or before a frame B, when a collision occurs between the two frames, one frame can be decoded due to its high signal to interference plus noise ratio (SINR). The other frame, it is realized herein, can be recovered using SIC. Either frame may be decoded first, regardless of which is transmitted first in time. However, because the length of the frames can vary and they do not necessarily start at the same instant, the receiver finishes the decode process for the two frames at different times. Acknowledgment messages are sent back after a SIFS time interval after the receiver determines the transmission status of both frames. The transmission status indicates either a successful decoding or a failed decoding. The transmitter of the one decoded frame receives a delayed ACK. It is realized herein, a STA can signal the receiver to indicate whether it can tolerate a delayed ACK, allowing the receiver to send the first ACK messages to STAs that do not tolerate delayed acknowledgments.

Alternatively, when only one of the two frames can be decoded, the receiver can acknowledge the successful frame after a SIFS when it determines the transmission status of both frames, and the STA that transmitted the failed frame will initiate a retransmission following the CSMA/CA protocol. The receiver can also send a NACK message with a broadcast address to notify the STA that transmitted the failed frame, thereby instructing it to retransmit the frame. The NACK message can include transmission and receiving time of the failed frame or a sequence number, among other parameters, to help the transmitter reach a contention-free retransmission. When the failed frame can be partially decoded, for example, when the transmitter address for the failed frame can be decoded, the receiver can send a unicast NACK or a poll message to the targeted transmitter to notify it for a contention-free retransmission. This can avoid further backoff and contention for the frame transmission. The NACK message or poll message can indicate a new encoding rate and transmission rate for the next retransmission. The receiver can also use a technique similar to HARQ to combine several copies of the same frame from different transmissions.

When both frame transmissions fail, but the receiver can decode the MAC address of one transmitter, the receiver can send a unicast NACK or poll message to the one transmitter to notify it for contention-free retransmission. The receiver can buffer the previously collided data and apply SIC to decode the other frame, once one data frame is decoded successfully. The receiver can then acknowledge the other frame if it can be decoded successfully.

It is also realized herein, to help a receiver synchronize and decode collided frames, different STAs can use different physical (PHY) preamble signals. For example, unassociated STAs use the same synchronization sequences, such as short training field (STF) and long training field (LTF). After association, a STA obtains a set of predetermined preamble sequences from the AP and randomly selects one for its own transmission. Alternatively, the STA can use the preamble sequences assigned by the AP for its own transmissions.

Although a majority of WiFi systems use the contention based DCF for user coordination, contention-free transmissions are also possible in WiFi hybrid coordination function (HCF) mode. It is realized herein an uplink multi-user transmission technique can use SIC. The AP can poll multiple users to transmit at the same time. The AP indicates to the polled STAs the time they are allowed to transmit, the preamble sequences, and their recommended power levels.

The AP can also allocate different power levels for different users to favor the capture effect for successful data decoding.

It is further realized herein that SIC can also be used for multi-user downlink transmissions to improve spatial utilization, which can be simple and effective compared to multi-user multiple-input multiple-output (MIMO). In certain embodiments, a single antenna can be used. For example, the AP uses power level P1 to transmit a frame for STA1 and use P2 for STA2. Assuming P1 is much larger than P2, both STA1 and STA2 can decode the downlink frame for STA1. STA2 then applies SIC to decode its own data after it decodes that for STA1. To protect the downlink transmissions from other transmission interferences, the AP indicates the maximum length of the two frames in the length fields of the both frames preambles, e.g., Max (STA1's frame, STA2's frame). STA1 can send an ACK after a SIFS if it can successfully decode the frame. STA2 decodes STA1's frame, and applies SIC to obtain its own frame. If successfully decoded, STA2 can send an ACK after STA1's ACK. Or, STA2 also can send an ACK in the same time slot of STA1's ACK, but using a different preamble and/or power level to allow the AP to use SIC for decoding both ACKs. Note that both STAs can use a single transceiver or multiple transceivers for MIMO communications with the AP.

In another embodiment, each time a WiFi STA detects a collision after an ACK timeout, the STA may not perform exponential backoff immediately. Instead, the STA can decrease the selected MCS rate for the retransmission, and retransmit with the same backoff window. The STA resumes doubling its backoff window after the retransmission failed after one or multiple rounds. Each time a collision is detected, the STA can either increase the backoff window by a ratio of r, e.g., 1=<r<=2, or decrease the MCS rate for retransmissions, or use a combination of increasing the backoff time and decreasing the MCS rate simultaneously for retransmissions.

FIG. 1 is a diagram of one embodiment of a wireless communication system 100. System 100 includes an AP 110 and three stations 120, 130, and 140. AP 110 is sometimes referred to as a station, a base station, a node B, or an enhanced node B, among others. Stations are sometimes referred to as terminals, users, user stations, UEs, mobiles, or mobile stations, among others. Stations 120, 130, and 140 are configured to share a channel over which frames are transmitted to AP 110 in a contention based manner. Stations 120, 130, and 140 are further configured to communicate directly to each other, for example, as in an ad-hoc network. A collision occurs when two or more frames are transmitted over the channel and overlap in time. Stations 120, 130, and 140 are coordinated by a DCF according to CSMA/CA protocols. To transmit, a station first performs a CCA by sensing the channel for some duration, e.g., the DIFS. When the channel is busy, the station waits until the channel is idle for a DIFS, and then waits an additional random backoff period. When the station transmits and the data is received successfully by another station, e.g., AP 110, AP 110 sends an ACK to the station. Absent an ACK, the station retransmits the frame after a random backoff.

When there is a collision, for example, stations 120 and 130 each transmit a frame and the transmissions overlap in time, one of the frames may be at least partially decoded. In some collisions, station 120 may transmit first, while in other collisions station 130 may transmit first. In some collisions, stations 120 and 130 transmit at the same time. For example, assume a frame A, transmitted by station 120, is successfully decoded and a colliding frame B is transmitted by station 130. Rather than losing the colliding frame B, AP 110 uses SIC to recover the colliding frame B from the received signal. Given colliding data for the transmissions by stations 120 and 130, the colliding frame B can be recovered by subtracting successfully decoded data from the colliding data in the received signal, the difference effectively being the colliding frame B. The colliding frame B is then decoded from the recovered data, or decoded from a combination of the recovered data and one or more retransmissions of the colliding frame B.

Figure 2:
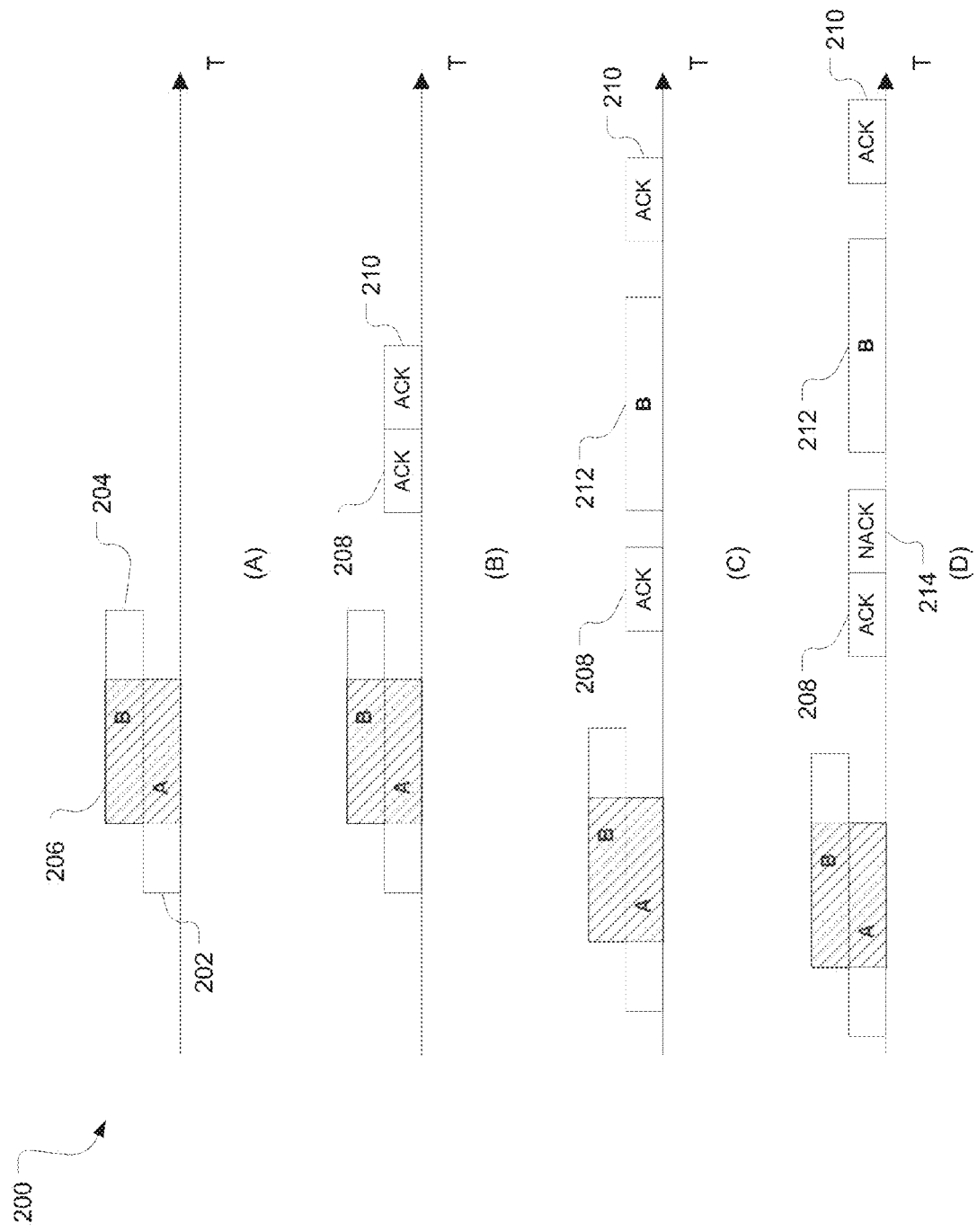
FIG. 2 is an illustration of a collision and collision resolution.

FIG. 2 is an illustration of a collision 200 and collision recovery. FIG. 2(A) illustrates collision 200 in time, i.e., the horizontal axis, between a transmission A 202 of a frame A from a first station and a transmission B 204 of a frame B from a second station. Transmission A 202 and transmission B 204 have an overlap region representing colliding data 206. FIG. 2(B) illustrates one possible collision resolution according to an embodiment of the AP or method of collision resolution introduced herein. The frame A is successfully decoded from transmission A 202 by the AP and the AP transmits an ACK 208 to the first station in turn. Using SIC, the AP recovers the frame B from transmission B 204 and colliding data 206. The AP then decodes the frame B and sends an ACK 210 to the second station in turn.

FIG. 2(C) illustrates another possible collision resolution according to another embodiment of the AP or method of collision resolution introduced herein. As in the embodiment illustrated in FIG. 2(B), the frame A is successfully decoded from transmission A 202 by the AP and the AP transmits ACK 208. The AP is unable to completely recover and decode the frame B from transmission B 204 using SIC, so the frame B is transmitted again form the second station in retransmission B 212 after some time. The time between transmission B 204 and retransmission B 212 generally includes a DIFS and a backoff time. Once retransmission B 212 is received, the frame B is completely decoded from whatever data was recovered from colliding data 206 and retransmission B 212. The AP then transmits an ACK to the second station.

FIG. 2(D) illustrates yet another possible collision resolution according to another embodiment of the AP or method of collision resolution introduced herein. As in the embodiments illustrated in FIGS. 2(B) and 2(C), the frame A is successfully decoded from transmission A 202 by the AP and the AP transmits ACK 208 to the first station. The AP is again unable to completely recover and decode the frame B from transmission B 204 using SIC. When the AP is able to recover and decode a transmit address for transmission B 204, i.e., the AP is able to partially decode transmission B 204 with the aid of SIC, the AP sends a NACK 214 to the second station via the transmit address. When the AP is unable to recover and decode a transmit address from transmission B 204, the AP can send NACK 214 to a multicast address. In either case, the second station receives the NACK and makes retransmission B 212. The frame B is then completely decoded from retransmission B 212 and whatever data was at least partially recovered and decoded from transmission B 204 and colliding data 206. The AP then sends the second station ACK 210.

Figure 3:
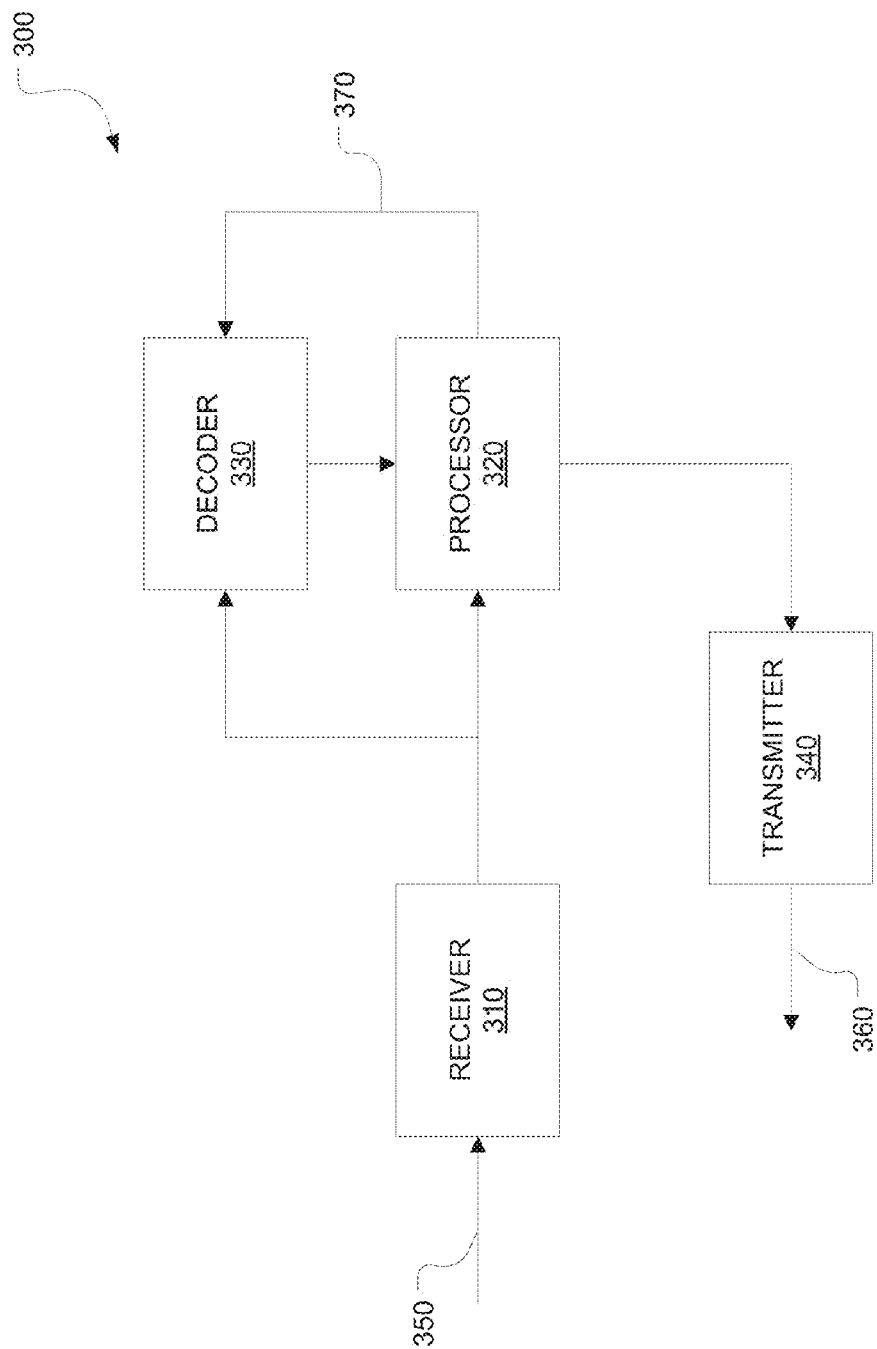
FIG. 3 is a block diagram of one embodiment of a station.

FIG. 3 is a block diagram of one embodiment of a station 300. Station 300, in certain embodiments, can be a base station, a node B, an enhanced node B, a terminal, user, user station, UEs, mobile, or mobile station, among other devices. Station 300 includes a receiver 310, a processor 320, a decoder 330, and a transmitter 340. Receiver 310 receives incoming wireless signals 350 over one or more channels. Incoming wireless signals 350 include a transmission A of a frame A. The transmission A originates at a first station. Incoming wireless signals 350 also include a transmission B of a frame B. The transmission B originates at a second station. Transmissions A and B are made over a single channel. Frames A and B are transmitted at various times, have various lengths, and overlap in time, i.e., collide. In some embodiments, transmission B is made before or at the same time as transmission A. In other embodiments, transmission A is made before transmission B.

Given the collision of the frame A and the frame B, decoder 330 may be able to at least partially decode one of the frames. A frame transmitted first in time is not necessarily the first decoded. When decoder 330 successfully decodes a frame, the frame A for example, the decoded frame is passed to processor 320. Processor 320 uses SIC to at least partially recover the frame B from the colliding signals of the frames A and B. Once the signal corresponding to frame B is recovered, the recovered signal 370 is passed back to decoder 330 for decoding. Whether frame B is partially or completely recovered is not known until an attempt to decode frame B is made. When the frame B cannot be completely recovered and completely decoded, a retransmission of the frame B by the second station is made. Receiver 310 receives the retransmission and passes the received signal to decoder 330 for decoding.

When frames A and B are received and decoding attempted, processor 320 determines a status for transmissions A and B, which is generally either successfully decoded or not. In the event a transmission is not successfully decoded, at least one retransmission typically follows. Processor 320 indicates the status of each transmission to the respective originating stations using ACK and NACK messages 360. Processor 320 instructs transmitter 340 to transmit ACK and NACK messages 360 once decoding and collision recovery are attempted or completed. In the example mentioned above, where the frame A is successfully decoded by decoder 330, processor 320 instructs transmitter 340 to send an ACK message to the first station. When the frame B is also decoded, an ACK message is also sent to the second station. The ACK messages to the first and second stations are sent serially, one after the other, the latter of which is considered a delayed ACK. The ACK message for frame A may be another delayed ACK if it is sent after an attempt to decode frame B is made and the transmission statuses of frames A and B are determined. In certain embodiments, some stations can tolerate a delayed ACK, while others cannot. Stations that can tolerate delayed ACKs can communicate this tolerance to station 300. Processor 320 can then prioritize ACK messages according to which stations can tolerate delayed ACKs and which cannot. For example, if both frames A and B are successfully decoded, and the first station communicates its tolerance of delayed ACKs to station 300, processor 320 instructs transmitter 340 to send the ACK to the second station first and then send the ACK to the first station.

When either frame is merely partially decoded, particularly when the transmit address is decoded, processor 320 can instruct transmitter 340 to transmit a NACK message to the originating station via the transmit address, which will trigger a retransmission of the partially decoded frame. When decoding is unsuccessful and a transmit address cannot be recovered, a multicast NACK message can be sent. The originating station receives the multicast NACK and eventually retransmits.

Processor 320 and decoder 330 can be implemented in one or more processors, one or more ASICs, one or more FPGAs, dedicated logic circuitry, or any combination thereof, all collectively referred to as a processor. The respective functions for processor 320 and decoder 330 can be stored as instructions in non-transitory memory for execution by the processor.

Figure 4:
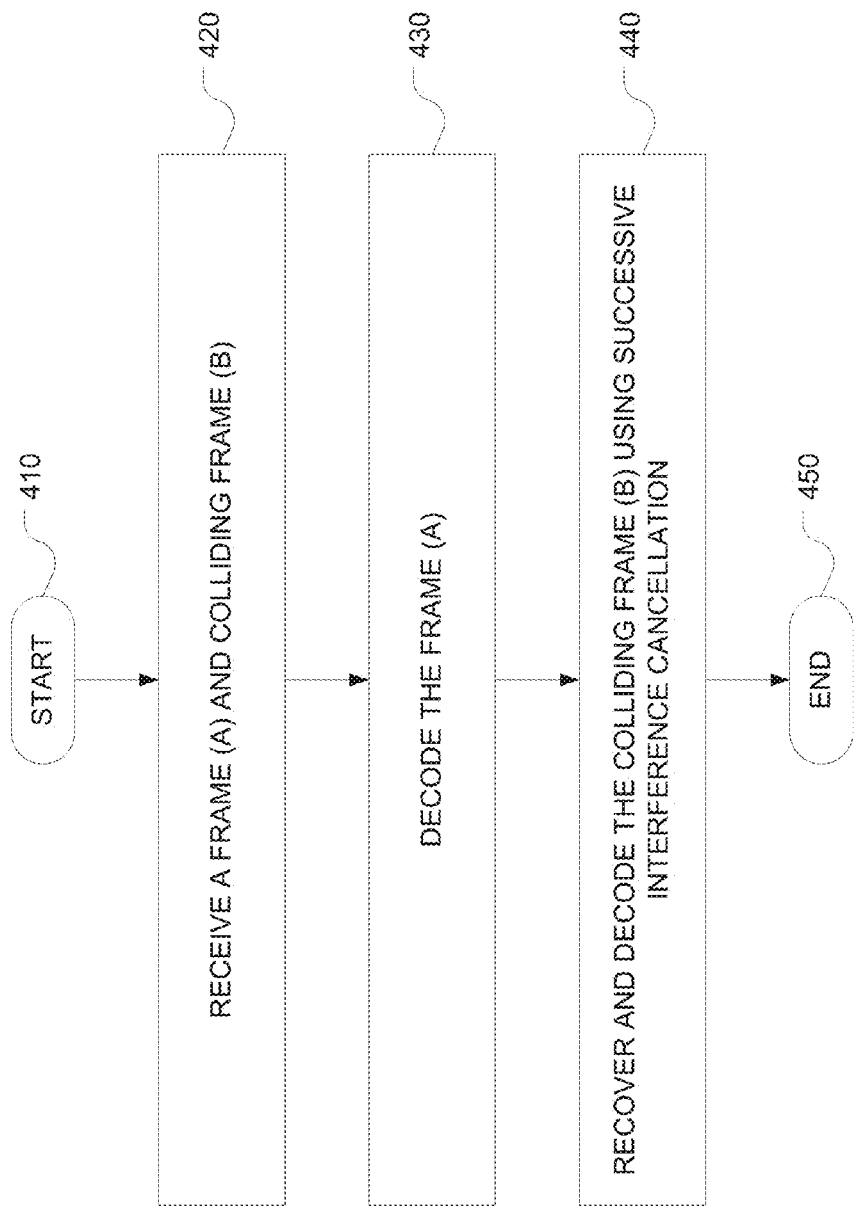
FIG. 4 is a flow diagram of one embodiment of a method of collision recovery.

FIG. 4 is a flow diagram of one embodiment of a method of collision resolution. The method begins at a start step 410. At a receiving step 420, a frame A and a colliding frame B are received at an AP. The frame A and the colliding frame B are transmitted over a single channel and overlap in time. In some embodiments, frame A is transmitted before or at the same time as frame B. In other embodiments, frame B is transmitted before frame A. At a first decoding step 430, decoding is attempted on the frame A. If successful, an ACK can be sent to a first station from which the frame A is transmitted. If partially successful and at least a transmit address is decoded, a NACK can be sent to the first station. The first station can then retransmit the frame A. Once the frame A is completely decoded, the colliding frame B can be recovered and decoded at a second decoding step 440 using SIC. After SIC, decoding the colliding frame B is attempted. Even with SIC, the colliding frame B may not be completely decodable from the colliding data. In that case, a retransmission of the colliding frame B is made. The retransmission can be triggered by a NACK message to a second station from which the colliding frame B is transmitted, or following a DIFS and backoff time. Given one or more retransmissions of the colliding frame B and any portion of the colliding frame B recovered from the colliding data using SIC, the colliding frame B is decoded. The method then ends at an end step 450.

Figure 5:
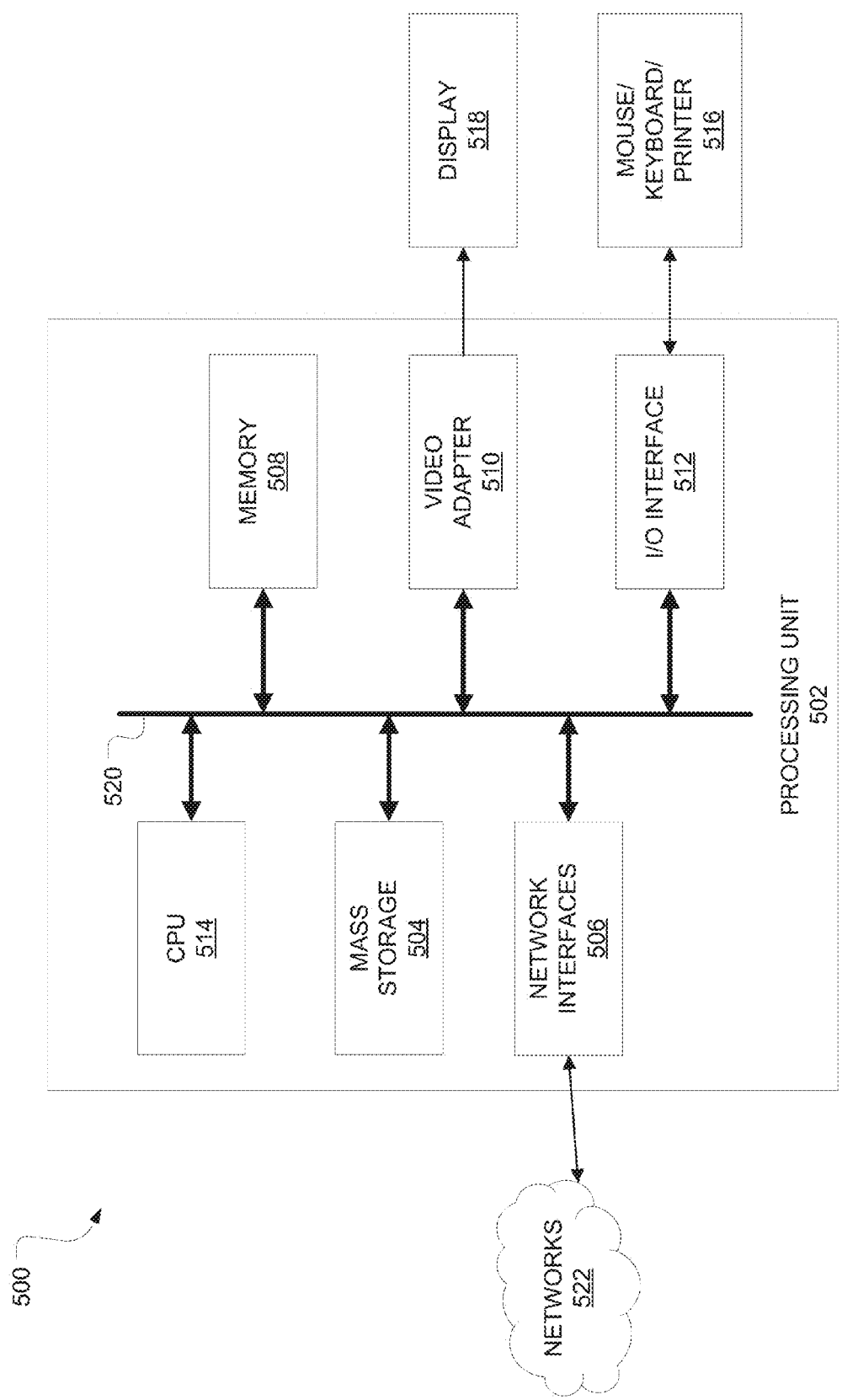
FIG. 5 is a block diagram of one embodiment of a computing system.

FIG. 5 is a block diagram of a computing system 500 that may be used for implementing the devices and methods disclosed herein. Specific devices may utilize all of the components shown or only a subset of the components. Levels of integration may vary from device to device. Furthermore, a device may contain multiple instances of a component, such as multiple processing units, processors, memories, transmitters, receivers, etc. The computing system 500 may comprise a processing unit 502 equipped with one or more input/output devices, such as a speaker, microphone, mouse, touchscreen, keypad, keyboard, printer, display, and the like. The processing unit may include a central processing unit (CPU) 514, memory 508, a mass storage device 504, a video adapter 510, and an I/O interface 512 connected to a bus 520.

The bus 520 may be one or more of any type of several bus architectures including a memory bus or memory controller, a peripheral bus, video bus, or the like. The CPU 514 may comprise any type of electronic data processor. The memory 508 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 508 may include ROM for use at boot-up, and DRAM for program and data storage for use while executing programs.

The mass storage 504 may comprise any type of non-transitory storage device configured to store data, programs, and other information and to make the data, programs, and other information accessible via the bus 520. The mass storage 504 may comprise, for example, one or more of a solid state drive, hard disk drive, a magnetic disk drive, an optical disk drive, or the like.

The video adapter 510 and the I/O interface 512 provide interfaces to couple external input and output devices to the processing unit 502. As illustrated, examples of input and output devices include a display 518 coupled to the video adapter 510 and a mouse/keyboard/printer 516 coupled to the I/O interface 512. Other devices may be coupled to the processing unit 502 and additional or fewer interface cards may be utilized. For example, a serial interface such as Universal Serial Bus (USB) (not shown) may be used to provide an interface for a printer.

The processing unit 502 also includes one or more network interfaces 506, which may comprise wired links, such as an Ethernet cable or the like, and/or wireless links to access nodes or different networks. The network interfaces 506 allow the processing unit 502 to communicate with remote units via the networks. For example, the network interfaces 506 may provide wireless communication via one or more transmitters/transmit antennas and one or more receivers/receive antennas. In an embodiment, the processing unit 502 is coupled to a local-area network 522 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of collision resolution, comprising:
   receiving a frame A from a first station and a colliding frame B from a second station, wherein the frame A and the colliding frame B are received over a channel and overlap in time;
   decoding the frame A;
   recovering and decoding the colliding frame B, at least partially, using successive interference cancellation (SIC);
   sending a first acknowledgment (ACK) to the first station, wherein the first ACK includes a delayed ACK;
   receiving, from the first station, a message indicating the delayed ACK can be tolerated; and
   sending a second ACK to the second station before the sending the first ACK, when the colliding frame B is completely decoded.

2. The method of claim 1, further comprising determining a transmission status A for the frame A and a transmission status B for the colliding frame B.

3. A method of collision resolution, comprising:
   receiving a frame A from a first station and a colliding frame B from a second station, wherein the frame A and the colliding frame B are received over a channel and overlap in time; decoding the frame A;
   recovering and decoding the colliding frame B, at least partially, using successive interference cancellation (SIC); and
   sending, when the colliding frame B is not completely decoded, a message including a second negative acknowledgment (NACK), a transmission time, and a receiving time for the colliding frame B to the second station.

4. The method of claim 3, wherein the sending the message comprises transmitting the second NACK to a broadcast address.

5. The method of claim 3, wherein the sending the message comprises transmitting the second NACK to the second station when a transmitter address for the colliding frame B is decoded.

6. The method of claim 3, further comprising:
   decoding a transmitter address for the frame A;
   sending, via the transmitter address, a first negative acknowledgment (NACK) to the first station;
   buffering colliding data from the frame A and the colliding frame B; and
   receiving a retransmission of the frame A.

7. The method of claim 1, further comprising:
   associating a station from which the frame A is transmitted; and
   identifying a set of physical (PHY) preamble sequences for the station to use when transmitting.

8. The method of claim 1, wherein the colliding frame B is transmitted first in time with respect to the frame A.

9. A station, comprising:
   a receiver configured to receive a frame A from a first station and a colliding frame B from a second station, wherein the frame A and the colliding frame B are received over a channel and overlap in time;
   a decoder configured to decode the frame A;
   a processor configured to:
      recover the colliding frame B using successive interference cancellation (SIC), and
      pass the colliding frame B to the decoder for decoding;
   a transmitter configured to transmit an acknowledgment (ACK) A to the first station, wherein the ACK A comprises a delayed ACK;
   the receiver is further configured to receive, from the first station, a message indicating the delayed ACK can be tolerated; and
   wherein the transmitter is further configured to transmit an ACK B to the second station before transmitting the ACK A, when the colliding frame B is completely decoded.

10. The station of claim 9, wherein the processor is further configured to determine a first transmission status for the frame A and a second transmission status for the colliding frame B.

11. A station, comprising:
   a receiver configured to receive a frame A from a first station and a colliding frame B from a second station, wherein the frame A and the colliding frame B are received over a channel and overlap in time;
   a decoder configured to decode the frame A;
   a processor configured to:
      recover the colliding frame B using successive interference cancellation (SIC), and
      pass the colliding frame B to the decoder for decoding; and
   a transmitter configured to transmit, when the colliding frame B is not completely decoded, a message including a negative acknowledgment (NACK) B, a transmission time, and a receiving time for the colliding frame B to the second station.

12. The station of claim 11, wherein the transmitter is configured to transmit the NACK B to a broadcast address.

13. The station of claim 11, wherein the transmitter is configured to transmit the NACK B to the second station when a transmitter address for the colliding frame B is decoded.

14. The station of claim 11, wherein the receiver is further configured to receive a retransmission of the frame A, the decoder is further configured to decode a transmitter address for the frame A, and the station further comprises:
- a transmitter configured to transmit a negative acknowledgment (NACK) A to a first station via the transmitter address; and
- a non-transitory memory configured to store colliding data from the frame A and the colliding frame B.

15. The station of claim 9, wherein the processor is further configured to:
- associate a station from which the frame A was received; and
- identify a set of physical (PHY) preamble sequences for the station to use when transmitting.

16. The station of claim 9, wherein the colliding frame B is transmitted first in time with respect to the frame A.

* * * * *